United States Patent
Ohsaki et al.

(10) Patent No.: US 10,678,941 B2
(45) Date of Patent: Jun. 9, 2020

(54) PRIVACY FOCUSED NETWORK SENSOR DEVICE OBJECT RECOGNITION

(71) Applicant: International Business Machines Corporation, Armonk, NY (US)

(72) Inventors: Hiroyasu Ohsaki, Yokohama (JP); Satoshi Kawase, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 15/892,623

(22) Filed: Feb. 9, 2018

(65) Prior Publication Data

US 2018/0349639 A1    Dec. 6, 2018

Related U.S. Application Data

(63) Continuation of application No. 15/613,317, filed on Jun. 5, 2017.

(51) Int. Cl.
| | |
|---|---|
| *G06F 21/62* | (2013.01) |
| *G06F 21/60* | (2013.01) |
| *H04N 1/00* | (2006.01) |
| *G06F 21/32* | (2013.01) |

(52) U.S. Cl.
CPC ...... *G06F 21/6245* (2013.01); *G06F 21/6254* (2013.01); *G06F 21/32* (2013.01); *G06F 21/60* (2013.01); *H04N 1/00204* (2013.01)

(58) Field of Classification Search
CPC .................................................. G06Q 50/265
See application file for complete search history.

(56) References Cited

U.S. PATENT DOCUMENTS

| | | | |
|---|---|---|---|
| 8,867,853 B2 | 10/2014 | Migdal et al. | |
| 9,129,179 B1 | 9/2015 | Wong | |
| 9,182,828 B2 | 11/2015 | Boncyk et al. | |
| 2013/0276136 A1 | 10/2013 | Goodwin et al. | |
| 2014/0214895 A1 | 7/2014 | Higgins et al. | |
| 2016/0080642 A1 | 3/2016 | Jung et al. | |
| 2016/0162497 A1* | 6/2016 | Cho | G06F 16/7837 386/241 |
| 2017/0094018 A1* | 3/2017 | Ekstrom | H04L 67/20 |

(Continued)

OTHER PUBLICATIONS

Amin, A. H. M., Ahmad, N. M., & Ali, A. M. M. (May 2016). Decentralized face recognition scheme for distributed video surveillance in IoT-cloud infrastructure. In 2016 IEEE Region 10 Symposium (TENSYMP) (pp. 119-124). IEEE.*

(Continued)

*Primary Examiner* — Gabrielle A McCormick
*Assistant Examiner* — Maame Ofori-Awuah
(74) *Attorney, Agent, or Firm* — Nolan M. Lawrence

(57) ABSTRACT

A mapping between private information to be protected and identifier information for an object is recorded. The object is detected by analyzing sensor data received from a sensor device within a private computer network, in which the object has one or more attributes associated therewith. An analysis report is generated about the object by excluding the private information from the analysis report based on the mapping, in which the analysis report includes a non-private part of the one or more attributes. The analysis report is transmitted to a remote computer system located outside the private computer network without the private information.

1 Claim, 10 Drawing Sheets

(56) References Cited

U.S. PATENT DOCUMENTS

2017/0095157 A1\* 4/2017 Tzvieli ................ A61B 5/0077
2017/0195572 A1\* 7/2017 Wexler ................ H04L 65/4069
2018/0091361 A1\* 3/2018 Smith ................ H04L 41/0668

OTHER PUBLICATIONS

Ohsaki et al., "Privacy Focused Network Sensor Device Object Recognition", U.S. Appl. No. 15/613,317, filed Jun. 5, 2017.
IBM, List of IBM Patents or Patent Applications Treated as Related, Feb. 9, 2018, 2 pages.

\* cited by examiner

| DEVICE IDENTIFIER | NAME |
|---|---|
| camera_A | 1F Living |
| camera_B | 1F Hallway |

FIG. 2A

| UUID | DESCRIPTION |
|---|---|
| xxxxxxxxx | Person, male, 170 cm tall |
| yyyyyyyyy | Smartphone, white, silver case |

FIG. 2B

| UUID | RELATION | TARGET | PRIVACY |
|---|---|---|---|
| xxxxxxxxx | name | John | true |
| yyyyyyyyy | owner | xxxxxxxxx | true |

FIG. 2C

| ID | DEVICE IDENTIFIER | TIME | POSITION | ACTION | EMOTION |
|---|---|---|---|---|---|
| yyyyyyyy | camera_A | yyyymmddhhmmss | X,Y,Z | existing | N/A |
| xxxxxxxx | camera_A | yyyymmddhhmmss | X,Y,Z | walking | smiling |
| yyyyyyyy | camera_B | yyyymmddhhmmss | X,Y,Z | missin | N/A |

FIG. 3A

| ID | TIME | RELATION | TARGET |
|---|---|---|---|
| xxxxxxxx | yyyymmddhhmmss | touching | pppppppp |
| xxxxxxxx | yyyymmddhhmmss | released | pppppppp |

FIG. 3B

PRIVACY FOCUSED NETWORK SENSOR DEVICE OBJECT RECOGNITION

BACKGROUND

The present disclosure relates to techniques for object monitoring systems, more particularly, to techniques for managing object information detected by one or more sensor devices.

With recent improvements in image recognition technologies, object recognition, which is a process for identifying real-world objects such as persons, things and animals in a still or video images, has been applied to a variety of applications, including monitoring services for peoples, animals and personal items. In such monitoring services, it is a technical challenge to balance between convenience and privacy issues that include handling of sensitive data such as image data transmitted from monitoring cameras and other private data given for detected objects.

SUMMARY

According to embodiments of the present disclosure there is provided a computer program product for managing information of an object. The computer program product includes a computer readable storage medium having program instructions embodied therewith. The program instructions are executable by a processor to cause the processor to record a mapping between private information to be protected and identifier information for an object. The program instructions also cause the processor to detect the object by analyzing sensor data received from a sensor device within a private computer network, in which the object has one or more attributes associated therewith. The program instructions also cause the processor to generate an analysis report about the object by excluding the private information from the analysis report based on the mapping, in which the analysis report includes a non-private part of the one or more attributes. The program instructions cause the processor to further transmit the analysis report to a remote computer system located outside the private computer network.

According to another embodiment there is provided an apparatus for managing information of an object. The apparatus includes a memory storing program instructions, one or more interfaces configured to communicate with a sensor device and to access a private computer network, and a processor in communications with the memory and the one or more interfaces. The processor is configured, by executing the program instructions, to record a mapping between private information to be protected and identifier information for an object. The processor is also configured to detect the object, which has one or more attributes associated therewith, by analyzing sensor data received from a sensor device within the private computer network. The processor is further configured to generate an analysis report about the object, which includes a non-private part of the one or more attributes, by excluding the private information from the analysis report based on the mapping. The processor is configured further to transmit the analysis report to a remote computer system that is located outside the private computer network.

According to another embodiment there is provided an apparatus for retrieving information of an object. The apparatus includes a memory storing program instructions, an interface configured to access a private computer network, and a processor in communications with the memory and the interface. The processor is configured, by executing the program instructions, to receive a query from a user and to read a mapping between private information to be protected and identifier information for an object. The processor is also configured to exclude the private information from the query based on the mapping and to transmit the query to a remote computer system that is located outside the private computer network and records analysis reports about the object. The processor is further configured to receive, from the remote computer system, an answer including at least one non-private attribute associated with the object. The processor is configured to further complement the answer with the private information in the mapping and to present the answer to the user.

According to another embodiment there is provided a method executed by a computer system for collecting information of objects from one or more edge apparatus, each of which is located in a respective private computer network. The method includes receiving an analysis report about an object, which includes identifier information and one or more non-private attributes of the object, from one edge apparatus of the one or more edge apparatus. The method also includes recording the one or more non-private attributes of the object into a database in association with the identifier information of the object. The method further includes receiving a query from the one edge apparatus and finding a rule used for processing the query to create a search query for the database. The method includes further retrieving information matched with the search query from the database and returning an answer for the query to the one edge apparatus based on the information retrieved from the database. The answer includes the identifier information of the object that would be replaced with private information designated to be protected at the one edge apparatus.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A shows an example of configuration data including one or more entries according to an example embodiment of the disclosure;

FIG. 2B shows an example of object description data including one or more entries according to an example embodiment of the disclosure;

FIG. 2C shows an example of an object relationship data including one or more entries according to an example embodiment of the disclosure;

FIG. 3A shows an example of an object event information including one or more event entries according to an example embodiment of the disclosure;

FIG. 3B shows an example of an object relationship including one or more event entries according to an example embodiment of the disclosure;

Figure 1:
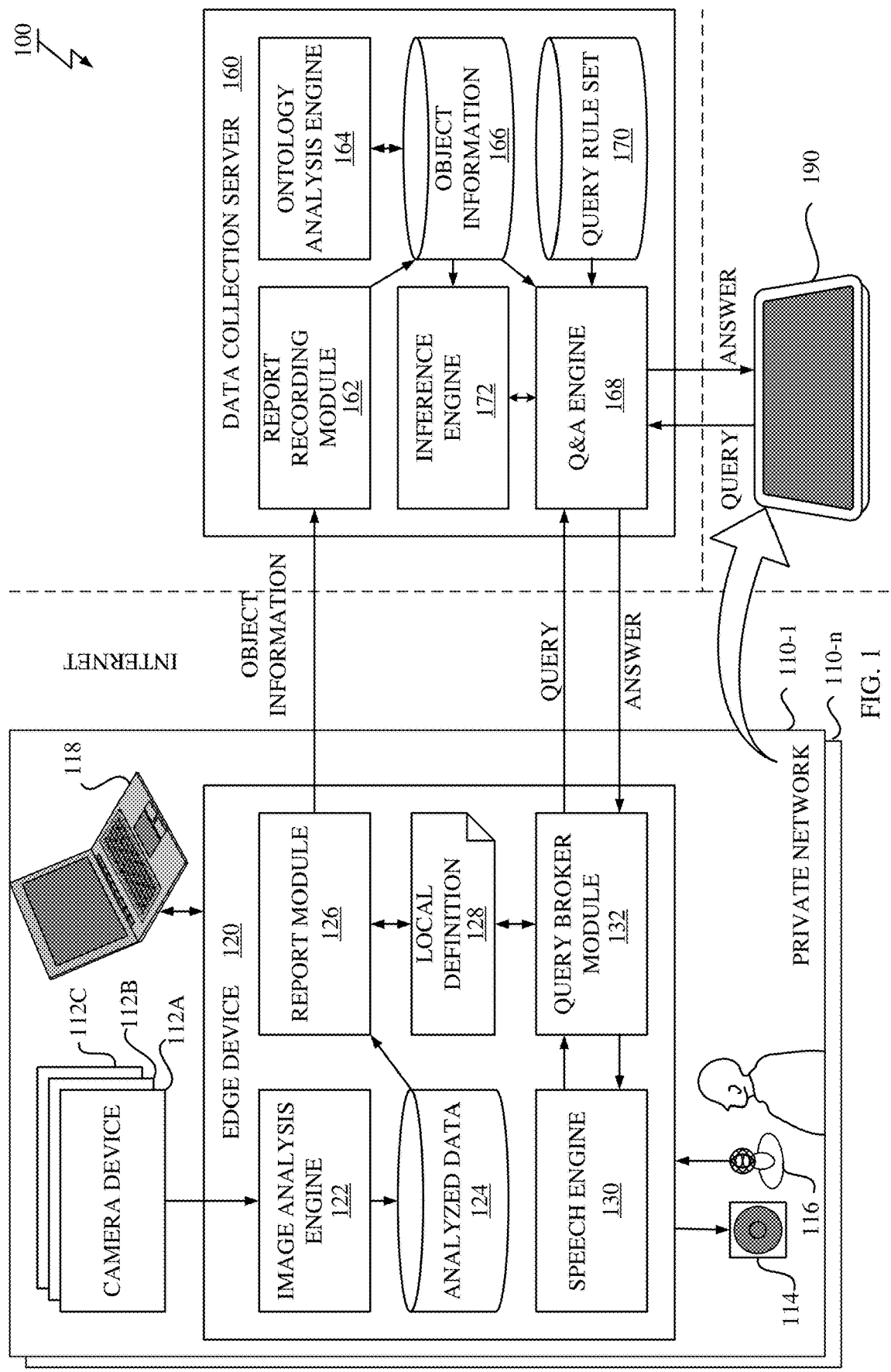
FIG. 1 illustrates a block diagram of an object monitoring and management system according to an example embodiment of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure are directed to apparatus, computer systems, methods and computer program products for managing object information detected by one or more sensor devices, in which information defined to be protected is confined within a private computer network while leveraging remote resources located outside the private computer network.

Hereinafter, referring to a series of FIGS. 1-9, an object monitoring and management system and processes for managing object information according to an example embodiment of the disclosure will be described.

Referring to FIG. 1, a block diagram of an object monitoring and management system 100 for managing object information is illustrated.

At first, referring to FIG. 1, collection and accumulation of object information detected by one or more camera devices will be described. As shown in FIG. 1, the object monitoring and management system 100 includes an edge device 120 located in a private computer network 110 and a data collection server 160 located typically on a cloud platform. The edge device 120 and the data collection server 160 may be communicatively coupled through a network (e.g., the internet). In FIG. 1, a plurality of edge devices 120, each of which is located in a respective private computer network 110-1, . . . , up to 110-n, is shown. Each private computer network 110 may be a private network such as LAN (Local Area Network), VPN (Virtual Private Network), etc. and can be considered as a network edge when assuming the data collection server 160 as a centralized node.

As shown in FIG. 1, there may be one or more camera devices 112 (alternatively, sensor devices) in each private computer network 110. Each camera device 112 may connect with the edge device 120 through an appropriate connection, which may include a USB (Universal Serial Bus) connection, a wireless connection, an IP (Internet Protocol) network connection, etc. Each camera device 112 may be configured to take an image of scene, which may or may not include one or more objects in a camera view range of the camera device 112, and to transmit the image to the edge device 120 connected therewith. Each camera device 112 may be installed in an area at a home, an office or public spaces, including a living room, a hallway, a lounge or other area where people come and go.

In some embodiments the camera device 112 is a still camera, the camera device 112 may transmit a series of still images with certain intervals (e.g. 1 minute, every 15 seconds, every 20 minutes) to the edge device 120. In some embodiments the camera device 112 is a video camera, the camera device 112 may transmit a stream of a video images with a certain frame rate (e.g., 10 frame per second, 24 frames per second) to the edge device 120 continuously.

In FIG. 1, there are three camera devices 112A, 112B, and 112C for one edge device 120; however, the number of the camera devices 112 is not limited to three, in embodiments, the number of the camera devices 112 may be one, two, or more than three for a respective edge device. In an example embodiment, the camera device 112 corresponds to a sensor device for the object monitoring and management system 100 and the image data taken by the camera device 112 corresponds to sensor data. However, in some embodiments, any other sensor devices such as a thermal image sensor, etc. can be used as the sensor device.

The edge device 120 may receive the image from the camera devices 112 and analyze the received image to detect one or more objects captured in the image. Then, the edge device 120 may transmit an analysis report about the detected object to the data collection server 160 through the internet. The object detected by the edge device 120 may include any real-world objects such as persons, animals, furniture, cellphones, machines, food, etc. The data collection server 160 may receive the analysis report transmitted from the edge device 120 and accumulate the analysis reports into its storage device.

In FIG. 1, a block diagram of the edge device 120 is depicted in more detail. As shown in FIG. 1, the edge device 120 may include an image analysis engine 122 for analyzing the image taken by the camera device 112; an analyzed data store 124 for storing analyzed data generated by the image analysis engine 122; a report module 126 for transmitting the analysis report to the data collection server 160 using the analyzed data stored in the analyzed data store 124; and a local definition data 128 for mapping between the identifier information and private information to be protected from leakage to outside of the private computer network 110.

The image analysis engine 122 is configured to detect one or more objects in the image by analyzing the image data received from the camera device 112. Object detection, which is a process of identifying a particular objet from the image data, can be performed by known object recognition/detection techniques (e.g., feature based, gradient based, derivative based, template matching, etc.). The image analysis engine 122 can have several image analysis capabilities in a manner that may depends upon available resources of the edge device 120.

The image analysis engine 122 may also be configured to determine whether an object is a newly detected object or not when detecting the object from the image data. The image analysis engine 122 may assign a unique identifier to the newly detected object as the identifier information, and give a name and description to the newly the detected object by using a generic name and general term, respectively. A captured image may be analyzed and the determination of whether a new object may include comparing the captured image to preexisting images and/or comparing the analysis of the captured images to preexisting analysis stored in the analyzed data store 124.

In some embodiments, the image analysis engine 122 has emotion recognition capability and the image captures human face at least in part, the image analysis engine 122 can classify emotion of a person into several categories, including smiling, crying, surprised, fearful, angry, etc., based on the image data. Classification of the emotion can be achieved by using known emotion recognition/detection techniques, such as feature based and template matching based approaches.

In some embodiments, the image analysis engine 122 has activity recognition capability. Activity recognition may utilize a series of images that capture motion of parts (e.g., arm, hand, leg, etc.) of human, animal or machine at least in part. The image analysis engine 122 can classify action of the person, animal, or machine into several categories, including sitting, walking, running, moving, etc. Classification of the action can be achieved by using known activity recognition/detection techniques, including feature based and template matching based approaches.

The image analysis engine 122 may or may not perform emotion recognition and activity recognition based on the computing resources (e.g., processing power, available memory) of the edge device 120. Also when the edge device 120 has limited computational resources, the image analysis engine 122 can offload any tasks onto another computer system also located in the same private computer network 110. In an embodiment, the image data taken by the camera device 112 would be handled locally in the private computer network 110 and prevented from being leaked to outside of the private computer network 110. The private computer network 110 is private in the sense that the network is managed by an individual, academic, government, or public organization and the resources in the network is not accessible from outside of the network without permission. The image data of which the image analysis has been completed may be discarded after the analysis, retained for a certain period, or retained indefinitely.

The analyzed data store 124 is configured to store analyzed data generated by the image analysis engine 122, which may include results of the image analysis about the one or more detected objects. The object may have one or more attributes associated therewith, each of which may be assigned or detected by the image analysis engine 122 using the image data. The one or more attributes of the object may include the unique identifier assigned for the object and one or more static or dynamic attributes detected for the object.

The static attributes may include a generic name (e.g., a person, a cat, a dog, a television set, a desk, a smartphone, etc.) and general description of the object using general terms (e.g., age, gender, type, size, color), which may be identified by the image analysis engine 122 from the image data.

The dynamic attributes may include a device identifier of the camera device 112 that has detected the object, time of detection of the object, a position of the object within the range of the camera device 112, an action that the object takes (e.g. walking), an emotion that the object expresses (e.g. smiling) and relationship between the object and another object (e.g., touching, releasing, holding, sitting on, etc.) as the attributes if available. A set of the device identifier of the camera device 112 and the position of the object may provide whereabouts information of the object. The time of the detection may provide whereabouts confirmation information. The dynamic attribute can be obtained by the image analysis engine 122 from the image data.

The report module 126 is configured to generate an analysis report about the detected object and to transmit the analysis report to the data collection server 160. The analysis report may include the unique identifier of the object and various attributes associated with the object. After receiving the analysis report, the data collection server 160 may record and manage the analysis report by using the unique identifier assigned to the detected object. The unique identifier is identifier information recorded to represent the object in the described embodiment.

The dynamic attributes of the detected object, which may include the device identifier, the time of detection, the position, the action, the emotion and the relationship, may be reported to the data collection server 160 by transmitting the analysis report for each time the object is detected. Also, the static attributes of the detected object may be typically shared between the edge device 120 and the data collection server 160 by transmitting the analysis report at a time of first detection or at a time when any change has been detected, if any.

However, one or more attributes, that may include even generic name and/or general description, can be considered private. For example, physical information (e.g., age, gender, height, etc.) would be considered as sensitive information for a certain person. Also a service user and/or one or more end users can give, a specific user comprehensible name (e.g., John, my wife, eldest son, etc.) and a specific relationship with other object (e.g., John's smartphone, John' eldest son, etc.) to the object. Note that the service user is a user who has registered to the data collection server 160 as a subscriber of the objection monitoring and management service and the service user may be assigned to one edge device 120. The end user is a user who can ask a question about objects to the object monitoring and management system 100 by using the edge device 120.

In order to control whether information can be presented to the data collection server 160 or not, mapping information specifying specific information that should not be presented to outside the private computer network 110 (i.e. private information) is defined in the local definition data 128, and the report module 126 refers to the local definition data 128 in preparing the analysis report.

The local definition data 128 may include configuration information of the user environment and object definition. The configuration information and the object definition may include private information and/or non-private information. The local definition data 128 includes mapping information that defines whether each item of information of the object is private in association to the unique identifier of the object (e.g., should be protected from leakage to outside the private computer network 110 including the data collection server 160). The local definition data 128 also includes mapping information that defines whether each item of information of the object is non-private in association to the unique identifier of the object (e.g., can be presented to the data collection server 160). The local definition data 128 of the object may be editable (e.g., a user decides to begin sharing or to stop sharing certain each item of information of the object.

FIG. 2A, FIG. 2B, and FIG. 2C show examples of data structure of information managed by the edge device 120. FIG. 2A shows an example of the configuration data including one or more entries, each of which includes the device identifier that is a unique identifier for the camera device 112 and a name or description about the camera device 112. FIG.

2B shows an example of an object description data including one or more entries, each of which includes the unique identifier of the object and a description about the object (including static attributes). The attribute included in the object description table of FIG. 2B may be shared between the edge device 120 and the data collection server 160.

FIG. 2C shows an example of an object relationship data including one or more entries, each of which includes the unique identifier of the object, a type of relation attribute, a target object for the relation attribute and a privacy flag indicating whether the relation attribute is private or non-private. The information recorded as private in the local definition data 128 may be represented by the unique identifier of the object in the analysis reports, etc.

In an example embodiment, a specific name of the object is defined as a target object associated with this object by "name" relation, where the target object is a special object (e.g., John) manually defined by the service user or end user. However, in embodiments, a specific name of the object can be defined as an attribute for the object in the object description shown in FIG. 2B, e.g., adding a column for a specific name attribute.

The user can add a specific relation to the object and edit the specific relation of the object via a user interface of the edge device 120 directly or by using an external terminal device 118 such as a personal computer, a smartphone, a tablet computer, etc. Also, the user can control whether the relation is private or not, by setting the privacy flag from the user interface of the edge device 120. By enabling the provision of inter-object relation (such as "my smartphone", "toy used by child", etc.) to the data collection server 160 would allow more flexibility of query processing.

In an example embodiment, attributes included in the description shown in FIG. 2B, do not have a flag indicating whether it is private or non-private. However, as described above, since some attribute may be sensitive information for certain person, in embodiments, each attribute included in the description shown in FIG. 2B may also have a privacy flag that indicates whether the attribute is private or non-private.

By using the local definition data 128, the report module 126 can generate the analysis report while excluding the private information from the analysis report.

In an embodiment, further a determination is made as to whether a change relating to the object has occurred or not. And the report module 126 may transmit the report to the data collection server 160 when detecting such change. The report module 126 can detect a change in position of the object (e.g., the object falls off a desk onto the floor, the object is moved from a chair to a desk, etc.) The report module 126 can detect a change in position of the object relative to other objects (e.g., overlapping of the object to other object, the object is behind another object, etc.) The report module 126 can detect the absence of the object (e.g., the object is missing and the last location of the object). By performing the determination prior to transmission of the analysis report, meaningless reports, such as repetition of identical reports, can be avoided. In an embodiment, the local definition data 128 would be stored locally in the private computer network 110, and prevented from being leaked to outside of the private computer network 110 without permission of the service user.

In FIG. 1, a block diagram of the data collection server 160 is also depicted in more detail. The data collection server 160 may be configured to collect object information from one or more edge devices 120. As shown in FIG. 1, the data collection server 160 may include a report recording module 162 for recording the analysis reports collected from the one or more edge devices 120; an ontology analysis engine 164 for analyzing the collected analysis reports to extract relationships between objects; and an object information database 166 for storing the analysis reports collected by the report recording module 162 and relationships extracted by the ontology analysis engine 164.

The report recording module 162 is configured to receive the analysis report from one edge device 120 and to record the analysis report into the object information database 166. The one or more attributes of the object included in the analysis report are recorded into the object information database 166 in association with the unique identifier of the object that is also included in the analysis report.

The ontology analysis engine 164 is configured to extract additional attributes by comparing current (latest) and past object information stored in the object information database 166. Such additional attributes may include a relationship between the object and other object (e.g., a person touches or release an item, etc.) and/or an action that the object takes (existing, walking, being moved, changing rooms, etc.). A process of identifying relationship between objects may be referred to as ontology in the field. In some embodiments, the edge device 120 may or may not have activity recognition capability based on the image data; however, the ontology analysis engine 164 has activity recognition functionality based on a series of object information entries.

The object information database 166 is configured to store the object information accumulated by the report recording module 162 and the ontology analysis engine 164. Database normalization, which is a process of organizing attributes and relations of the database, can be performed, in order to improve performance of query processing.

FIG. 3A and FIG. 3B show examples of data structure of object information managed by the data collection server 160. FIG. 3A shows an example of an object event information table including one or more event entries, each of which includes the unique identifier of the object and the one or more dynamic attributes. The one or more dynamic attributes may include the device identifier of the camera device 112 that has detected the object, the time of the detection of the object, the position of the object within the range of the camera device 112, the action that the object takes and the emotion that the object expresses.

For example, a situation like, "the Object-A, which is a mobile phone, exists at the coordinate (X, Y, Z) in the Room A with size R at the time yyyymmddhhmmss" may be stored in the object information database 166 after being normalized. For example, a situation like "the Person-A entered the Room-A at the time yyyymmddhhmmss" may be stored in the object information database 166.

FIG. 3B shows an example of an object relationship table including one or more event entries, each of which includes the unique identifier of the object, the time of the recognition of relation (e.g., touching, releasing) and the unique identifier of the target object for the relation. In addition to the object event information and object relationship tables, the object description table shared with the edge device 120 may also be stored in the object information database 166.

Next, referring further to FIG. 1, query processing for object information accumulated in the object monitoring and management system 100 will be described.

As shown in FIG. 1, the edge device 120 may further include a speech engine 130; and a query broker module 132. There may be also a loudspeaker 114 and a microphone 116 in the private computer network 110. The data collection server 160 may further include a Q&A engine 168; a query rule set store 170; and an inference engine 172.

The microphone 116 may be configured to pick up sound from the user environment and to transmit audio signal to the edge device 120. The loudspeaker 114 may be configured to receive audio signal from the edge device 120 and convert the audio signal into a corresponding sound. The loudspeaker 114 and the microphone 116 may be connected with the edge device 120 through an appropriate connection such as a wired connection or a wireless connection, e.g., Bluetooth™, Wi-Fi™, or built in the edge device 120 or an external terminal device that is connected with the edge device 120, independently.

The user can ask a query to and receive an answer for the query from the object monitoring and management system 100 via the edge device 120 through auditory communication. For this purpose, the speech engine 130 may be configured to provide a text-to-speech conversion and speech-to-text conversion functionalities. The speech engine 130 may receive the audio signal from the microphone 116 via analogue-to-digital converter (ADC), analyze the audio signal to extract a text of utterance of the user and pass resultant text to the query broker module 132. Also the speech engine 130 may receive a text from the query broker module 132, synthesis audio signal corresponding to the text and output the synthesized audio signal to the loudspeaker 114 via a digital-to-analogue convertor (DAC).

In the particular example, the loudspeaker 114 and the microphone 116 are used for auditory communication between the end user and the edge device 120. However, the way of communication is not limited to the auditory communication. An output device such as a display device, a projection device, a touch screen device and the like, and an input device such as keyboard device, a touch screen device and the like can be used for textual communication such as a chat. The output device for the textual communication and the input device for the auditory communication can be used in combination, and vice versa. Also, other type of communication devices such as a braille display can be used for the output device and the input device.

The query broker module 132 may receive a user query from the end user via the microphone 116 and the speech engine 130, and transmit the user query to the data collection server 160. The query broker module 132 may receive an answer for the user query from the data collection server 160 and return the answer to the end user via the speech engine 130 and the loudspeaker 114.

The query broker module 132 is further configured to translate the user query and the answer between a user comprehensible form and a privacy protected form. More specifically, the query broker module 132 replaces private information in the query with corresponding unique identifier and replaces the unique identifier included in the answer with corresponding user comprehensible information by referring to the mapping information in the local definition data 128.

For example, an example original user query "where is my smartphone?" from a particular user "John" may be translated into an example examined user query "where is [ID=yyyyyyyyyy]?", where "yyyyyyyyyy" represents a unique identifier of an object that has a "smartphone" attribute and an "owner" relation with the unique identifier "xxxxxxxxxx" of the particular user "John".

The query may include the user identifier of the end user who asks the user query, and may be recognized by voice recognition/authentication or face recognition/authentication technology, for examples. The user identifier indicates authority of the end user to the data collection server 160. The end user can obtain answers from data sets in accordance with its authority.

The Q&A engine 168 may receive the user query from the edge device 120 and return an answer based on the information retrieved from the object information database 166 to a requester of the user query, e.g., the edge device 120.

In order to return the answer, the Q&A engine 168 may first find a rule used for processing the user query to create a search query for the object information database 166. The query rule set store 170 may be configured to store a set of rules, each of which can be used for creating appropriate search query that is appropriate for user intent (e.g., ask for location of an object) expressed in the user query. For example, let suppose that the user intent is to ask for location of an object. The Q&A engine 168 may search for a current location where the object exists if possible, otherwise, a latest location where the object has most recently existed. If the system has lost sight of the object (e.g., since the object has entered or been placed in a container), the Q&A engine 168 may search for a location where the container object exists if possible. The rule can be defined or customized by the service user or end user, and may be shared among the service users if the owner of the rule permits.

In embodiments, the Q&A engine 168 of the data collection server 160 may perform natural language processing to extract the user intent from the user query written in natural language form. However, in embodiments, the query broker module 132 of the edge device 120 can perform natural language processing.

Since the user query includes the unique identifier of the object, the Q&A engine 168 may create the search query by using the unique identifier included in the user query. For example, an example user query "where is [ID=yyyyyyyyyy]?" may be converted into an example search query "SELECT*FROM objectEventinfo WHERE ID=yyyyyyyyyy ORDER BY time".

The Q&A engine 168 may retrieve information matched with the search query from the object information database 166. In accordance with the aforementioned example query, the answer may be generated from the latest record in the result. An example answer is "The item of ID=yyyyyyyyyy existed at a location (Camera_A, X, Y, Z) at the final confirmation time yyyymmddhhmmss at which time it was touched by pppppppppp."

The answer may include the unique identifier of the object, which would be replaced with the specific user comprehensible information at the edge device 120. In accordance with the aforementioned example query, the answer would be translated by the query broker module 132 of the edge device 120 into a complemented answer like, "Your smartphone was held by your eldest son in your living room at 7:00 today. Nothing is identified thereafter".

The answer may include a result originating from the analysis reports and/or a history of queries and its answers obtained from the particular edge device 120 in the past. In an example embodiment, since the object information database 166 includes collections of information obtained from the plurality of the edge devices 120 (plurality of service users), the particular edge device 120 (i.e., a particular service user) can leverage information originating from one or more other edge devices (e.g., other users).

When the answer that originates from merely information of the particular edge device 120 (e.g., the particular service user) is not correct, e.g., a feedback indicating that the answer is failed has been received, the inference engine 172 may infer an alternative answer by leveraging the information obtained from one or more other edge devices 120 in the past. The inference of the alternative answer will be described later in more detail.

With referring to further FIG. 1, there is an additional terminal device 190 located outside of the private computer network 110. The terminal device 190 may have query translating capability, which is provided by the query broker module 132 in the edge device 120, and hold its local definition data. The terminal device 190 may be configured to synchronize its local definition data with the local definition data 128 stored in the edge device 120 while staying within the private computer network 110. The terminal device 190 may keep the capability of translating a user query and an answer between a user comprehensible form and a privacy protected form by referring to its local definition data, even when the terminal device 190 is moved to outside of the private computer network 110.

In embodiments, each of modules 122~132 of the edge device 120 described in FIG. 1 may be implemented as, but not limited to, a software module including program instructions and/or data structures in conjunction with hardware components such as a processor, a memory, etc.; a hardware module including electronic circuitry; or a combination thereof. These modules 122~132 described in FIG. 1 may be implemented on a terminal device, which includes a personal computer, a tablet computer, a smartphone, a smart speaker, a communication robot, etc. These modules 122~132 described in FIG. 1 may be a server computer to which other terminal devices can access.

In embodiments, each of modules 162~172 of the data collection server 160 described in FIG. 1 may also be implemented as, but not limited to, a software module including program instructions and/or data structures in conjunction with hardware components such as a processor, a memory, etc.; a hardware module including electronic circuitry; or a combination thereof. These modules 162~172 described in FIG. 1 may be implemented on a single computer system such as a personal computer, a server machine, or over a plurality of devices such as a computer cluster in a distributed manner.

Hereinafter, referring to a series of flowcharts shown in FIGS. 4-9, the processes for managing object information according to an example embodiment of the disclosure will be described in more detail.

Figure 4:
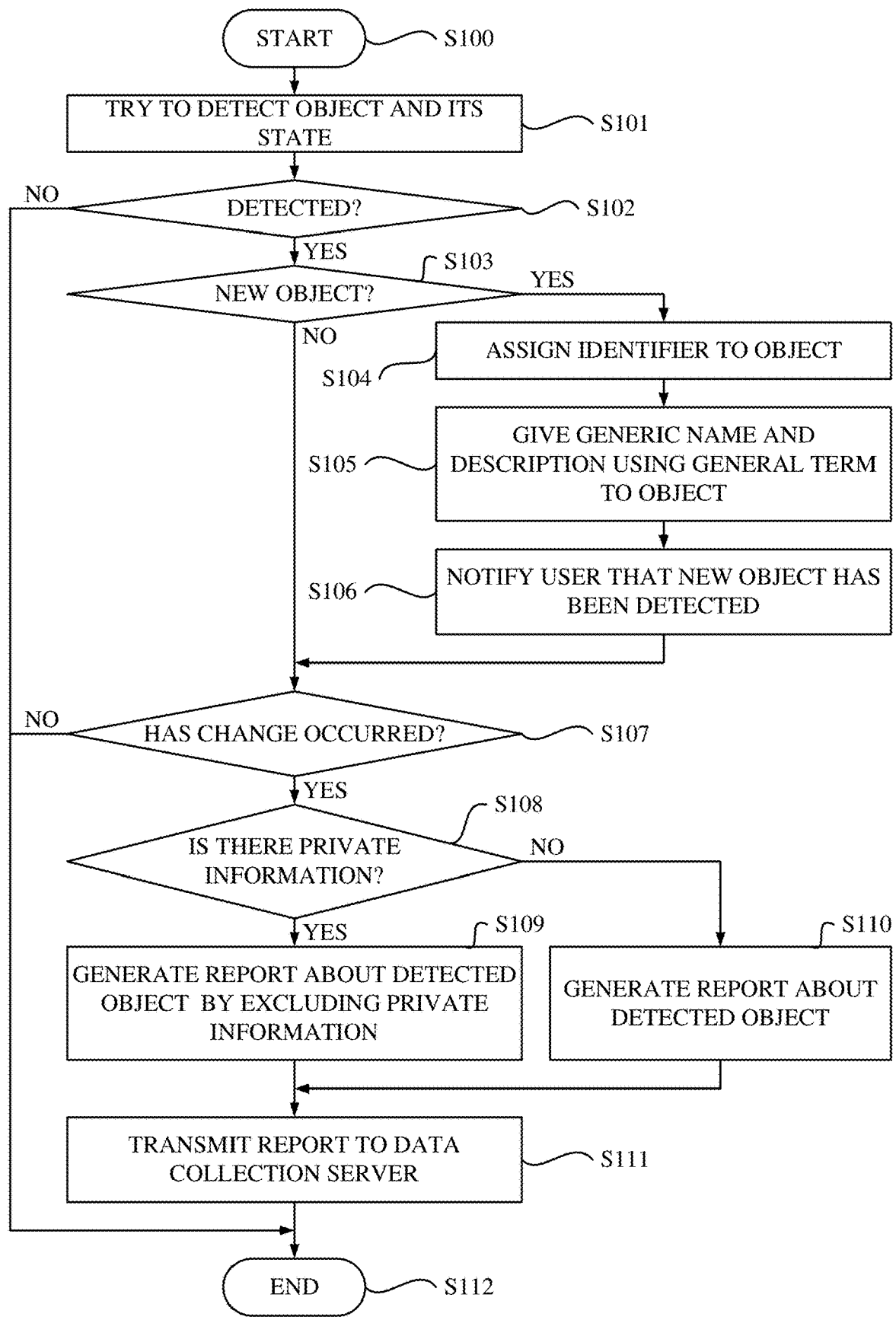
FIG. 4 is a flowchart depicting a process, executed by the edge device, for reporting an analysis report according to an example embodiment of the disclosure.

Referring to FIG. 4, a process for reporting an analysis report is described. Note that the process shown in FIG. 4 may be executed by the edge device 120, e.g., a processing unit that may implement at least the image analysis engine 122 and the report module 126, for example and as shown in FIG. 1.

The process shown in FIG. 4 may begin at step S100 in response to receiving image data (a still image or a frame of video image) from the camera device 112. At step S101, the processing unit may try to detect an object and its states by analyzing the image data. At step S102, the processing unit may determine whether the object is detected or not. When the object is detected at step S101 (YES), at step S103, the processing unit may further determine whether the detected object is newly detected or not.

When the object is determined to be new at step S103 (YES), control may transfer to step S104. At step S104, the processing unit may assign a unique identifier to the newly detected object. At S105, the processing unit may give a generic name and a description using a general term to the new object.

At step S106, the processing unit may notify a service user that the new object has been detected, and the control may transfer to step S107. Notification may be presented to the service user when the service user upon determining the login of the service user to the edge device 120. In embodiments, notification may be presented to the service user by email or through other messaging system. In embodiments, notification may be presented to the service user by an audible tone from the edge device 120. In response to receiving the notification, the service user can define a specific name and/or a specific relationship with another objection or a plurality of other objects (e.g., a toy for my first child and my second child) for the newly detected object by using an appropriate user interface.

Figure 5:
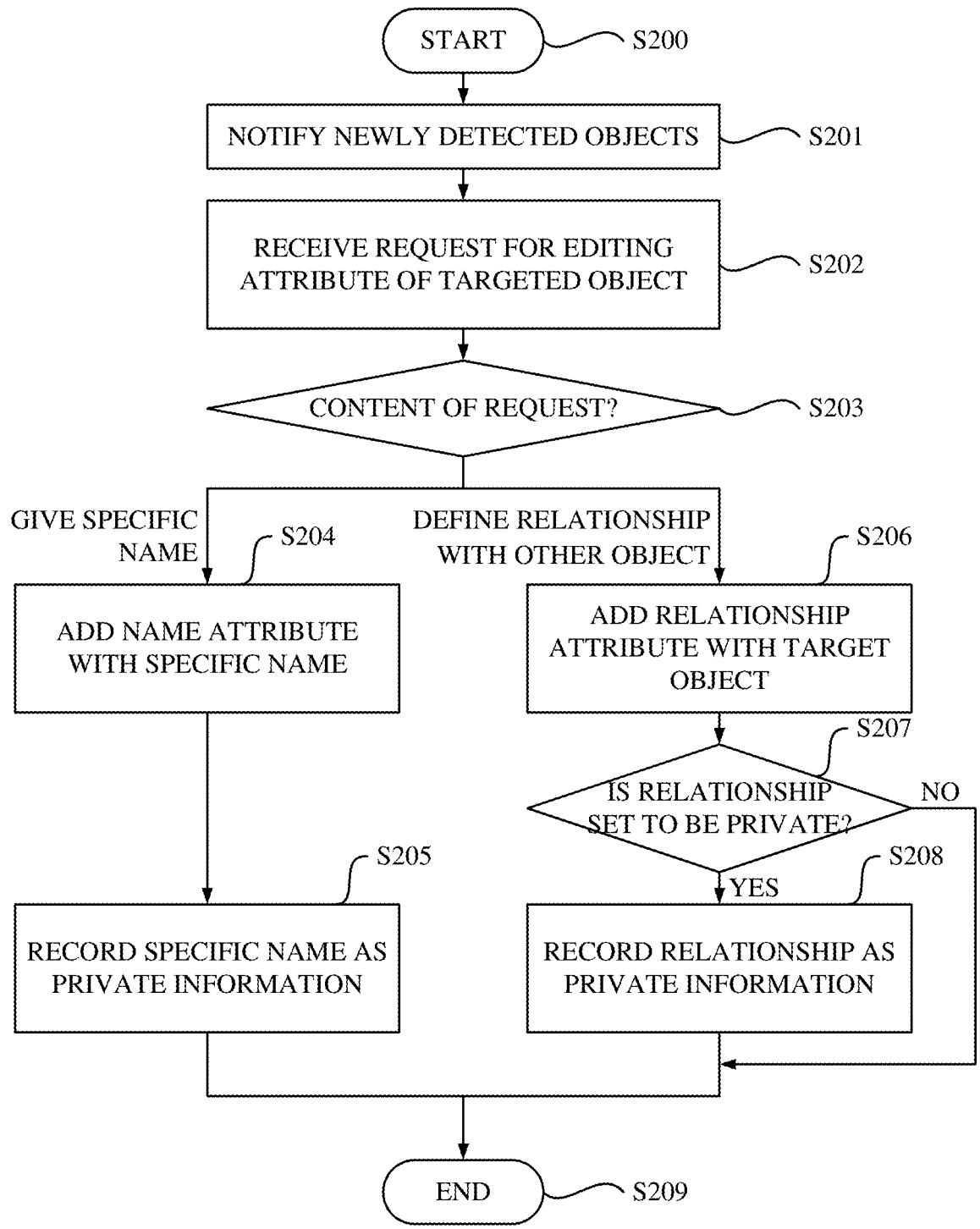
FIG. 5 is a flowchart depicting a process, executed by the edge device, for defining private information to a newly detected object according to an example embodiment of the disclosure.

Referring to FIG. 5, a process for defining private information to a newly detected object is depicted. Note that the process shown in FIG. 5 may be executed by the edge device 120, e.g., a processing unit of the edge device 120.

The process shown in FIG. 5 may begin at step S200 in response to receiving a login request from the terminal device 118 that the service user operates, for example. At step S201, the processing unit may notify that one or more objects have been newly detected from the last login time (e.g., a new device has been detected a service user has logged in two hours ago through a graphical user interface). For example, a dialog box, by which the service user can request to edit an attribute of an object among the one or more objects presented with its images, may be popped up on a screen of the terminal device 118. At step S202, the processing unit may receive a request for editing the attribute of the object from the service user.

At step S203, the control may branch in a manner depending on the content of the request. When the content of the request indicates giving a specific name to the object at step S203, the control may transfer to step S204. At step S204, the processing unit may add a new entry of a "name" relation attribute with the specific name (e.g., John) designated in the request. At step S205, the processing unit may record the specific name as the private information in the local definition data 128 in association with the unique identifier of the object, e.g., the privacy flag corresponding to the unique identifier is set to "true". Then, the process may end at step S209. As described, the specific name is recorded as the private information to be protected regardless of setting; however, in embodiments, the specific name can be handled as non-private information based on a predetermined setting.

When the content of the request indicates defining a relationship between the object and other target object (e.g., owner) at step S203, the control may transfer to step S206. At step S206, the processing unit may add a new entry of a new relation attribute with target object designated in the request. At step S207, the processing unit may determine whether the relationship should be private or not based on a predetermined setting. When the relationship is determined to be private at step S207 (YES), the control may transfer to step S208. At step S208, the processing unit may record the relationship as the private information in the local definition data 128. Then, the process may end at step S209. If the relationship is determined to be not private at step S207 (NO), the control may directly transfer to step S209 and the process may end at step S209.

Referring back to FIG. 4, when the detected object is determined to be not new in step S103 (NO), the control may transfer directly to step S107. At step S107, the processing unit may determine whether the change relating to the object has occurred or not. When the object is new, the processing unit would determine that the change has occurred. If the object is not new but the states of the object is changed in comparison with previous state (e.g., a change in position of the object, a change in orientation of the object, the object becoming partially overlapped to another object, the object becoming hidden), the processing unit would determine that the change has occurred. When the change is detected in step S107, the control may transfer to step S108.

At step S108, the processing unit may further determine whether there is any private information associated with the detected object or not by referring to the local definition data 128. If there is some private information associated with the detected object, e.g., there is at least one attribute having a private flag that is "true", the control may branch to step S109. At step S109, the processing unit may generate an analysis report about the detected object by excluding the private information from the analysis report based on the local definition data 128. The generated analysis report may be filtered so as not to include private information. The analysis report generated at step S109 may merely include a non-private part of the one or more attributes of the detected object but not includes private information including the image data. Then, the control may transfer to step S111.

If there is no private information associated with the detected object, the control may branch from step S108 to step S110. At step S110, the processing unit may generate an analysis report about the detected object and the control may proceed to step S111.

At step S111, the processing unit may transmit the analysis report to the data collection server 160 via its appropriate network interface, and the process may end at step S112. When no object is detected at step S101 (NO) or no change has not been detected at step S107 (NO), the control may directly transfer to step S112, and the process for the image data end at step S112.

Note that the process shown in FIG. 4 has been described as a process for a single object, for the purpose of illustration. However, the process shown in FIG. 4 can be adapted to cases where multiple objects are detected from the image data, with appropriate modifications.

Figure 6:
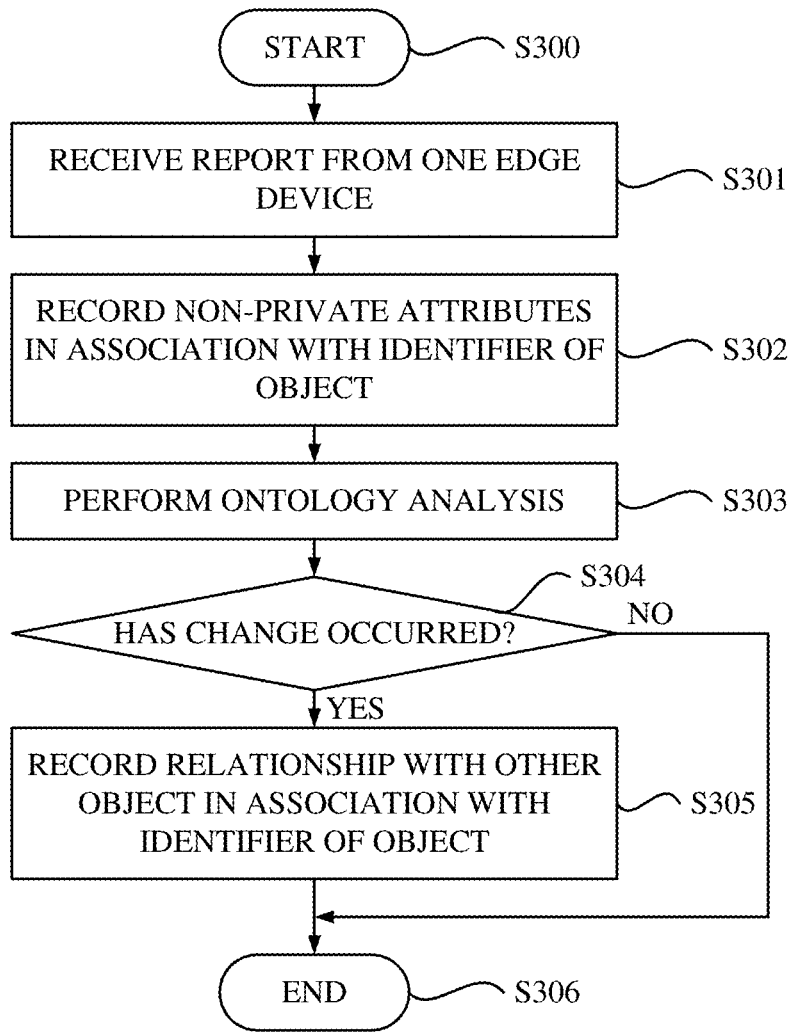
FIG. 6 is a flowchart depicting a process, executed by the data collection server, for recording an analysis report according to an example embodiment of the disclosure.

Referring to FIG. 6, a process for recording the analysis report is described. Note that the process shown in FIG. 6 may be executed by the data collection server 160, e.g., a processing unit that may implement at least the report recording module 162 and the ontology analysis engine 164 shown in FIG. 1.

The process shown in FIG. 6 may begin at step S300 in response to detecting an analysis report transmitted from one edge device 120. At step S301, the processing unit may receive the analysis report from the one edge device 120. The analysis report may include an identifier and one or more non-private attributes (attributes that are registered as non-private) of the object.

At step S302, the processing unit may record the non-private attributes included in the analysis report into the object information database 166 in association with the unique identifier of the object that is also included in the analysis report. At step S303, the processing unit may perform ontology analysis by comparing current (or latest/most recent) and past information of the object and the other object to extract relationship between the object and other object. A relation such as "a pillow—under—a smartphone" would be detected.

At step S304, the processing unit may determine whether the change has occurred or not. In response to determining that the change has been observed in step S304 (YES), the control may transfer to step S305. At step S305, the processing unit may record the extracted relationship into the object information database 166 in association with the unique identifier of the object. Then, the control may transfer to step S306, and the process may end at step S306. On the other hand, when the change has not been observed yet in step S304 (NO), the control may directly transfer to step S306 and the process may end at step S306.

Figure 7:
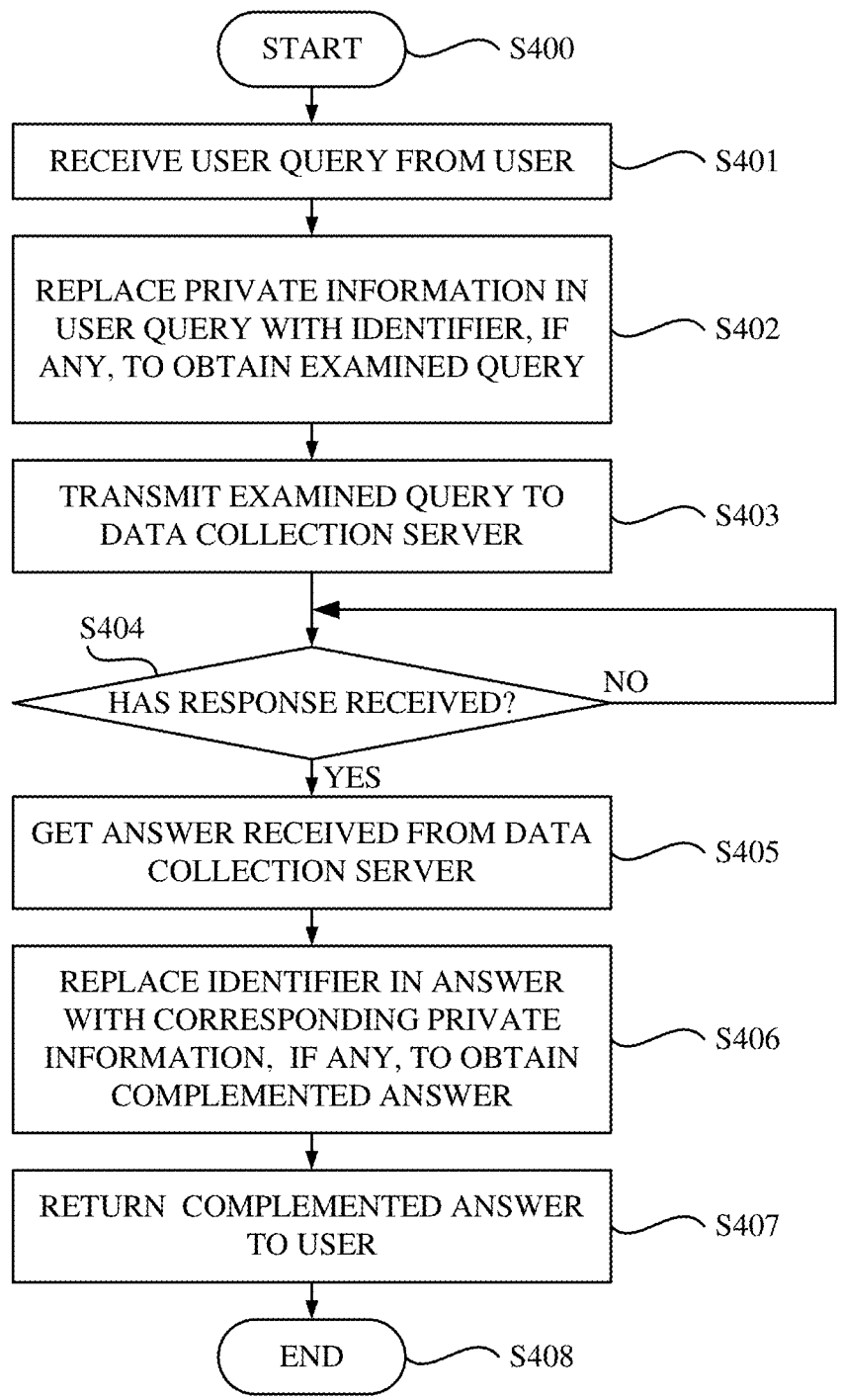
FIG. 7 is a flowchart depicting a process, executed by the edge device, for translating a user query and/or an answer for the user query between a user comprehensible form and a privacy protected form according to an example embodiment of the disclosure.

Referring to FIG. 7, a process for translating a user query and/or an answer for the user query between a user comprehensible form and a privacy protected form is described. Note that the process shown in FIG. 7 may be performed by the edge device 120 or the additional terminal device 190, e.g., a processing unit that implements at least the query broker module 132 on the edge device 120 or same functionality on the additional terminal device 190 shown in FIG. 1.

The process shown in FIG. 7 may begin at step S400 in response to detecting a user query from a given end user (a questioner) via the microphone 116 and the speech engine 130. At step S401, the processing unit may receive the user query from the questioner. The user query may include a user identifier of the questioner, which may be identified by speaker recognition/authentication and indicate authority of the questioner to the data collection server 160. At step S402, the processing unit may replace private information included in the user query with corresponding unique identifier, if any, by referring to the local definition data 128 to obtain an examined query. The examined query may have a privacy protected form. At step S403, the processing unit may transmit the examined query to the data collection server 160. At step S404, the processing unit may wait for a response from the data collection server 160.

In response to receiving the response from the data collection server 160, the control may transfer to step S405. At step S405, the processing unit may get an answer from the response received from the data collection server 160. The answer may include the unique identifier of an object. At step S406, the processing unit may replace the unique identifier included in the answer with corresponding private information, if any, by referring to the local definition data 128, to obtain complemented answer.

The answer received from the data collection server 160 may be complemented by using the mapping information recorded in the local definition data 128. The complemented answer may have a user-comprehensible form that the answer includes a specific name/description/relation that is easy to understand for the questioner, instead of cold and symbolical identifier. At step S407, the processing unit may return the complemented answer to the questioner via the speech engine 130 and the loudspeaker 114.

Figure 8:
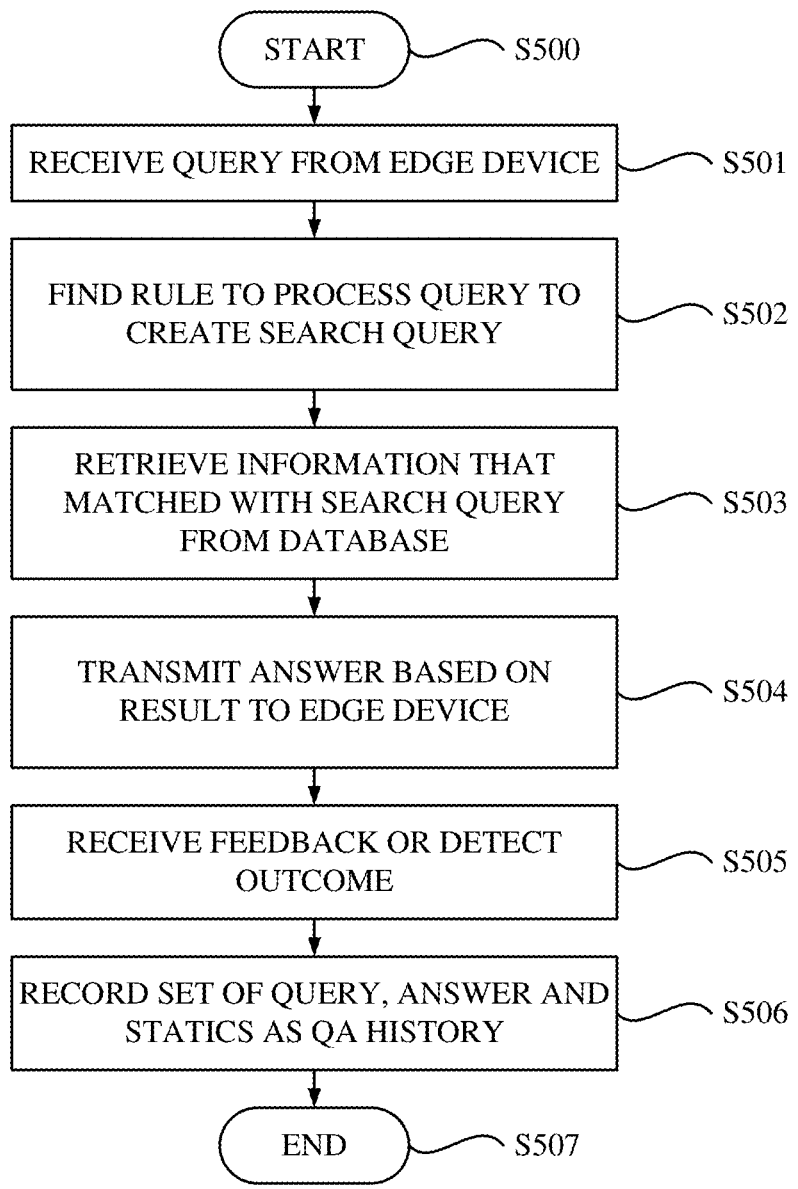
FIG. 8 is a flowchart depicting a process, executed by the data collection server, for retrieving information based on the user query according to an example embodiment of the disclosure.

Referring to FIG. 8, a process for retrieving information based on the user query is described. Note that the process shown in FIG. 8 may be performed by the data collection server 160, e.g., a processing unit that implements at least the Q&A engine 168 shown in FIG. 1.

The process shown in FIG. 8 may begin at step S500 in response to detecting a user query from the one edge device 120. At step S501, the processing unit may receive a user query from the one edge device 120 via its appropriate network interface. The received user query corresponds to the examined query transmitted from the edge device 120 at step S403 shown in FIG. 7. At step S502, the processing unit may find a corresponding rule used for processing the user query to create a search query for the object information database 166. If the rule includes a restriction regarding the questioner and the content of the question (e.g. No answer should be made for a question by a child as to where parent's wallet is located), the user query may be denied and an error response (e.g., permission denied) (including no response)

would be returned. In embodiments, if a rule includes a restriction regarding the particular questioner, the response may be an erroneous response (e.g., dad's wallet missing).

At step S503, the processing unit may retrieve information that is matched with the search query, from the object information database 166. At step S504, the processing unit may transmit answer based on the information retrieved from the object information database 166 to an edge apparatus (e.g., the edge device that provided the question).

At step S505, the processing unit may receive an explicit feedback from the questioner, or detect outcome of the answer as an implicit feedback. For example, the questioner who can find his requested item at the location indicated by the answer may express gratitude for assistance to the system 100 via the edge device 120. For example, the questioner who has failed to find his requested item at the location indicated by the answer may ask for location again. For example, the system 100 may detect an event indicating that an object corresponding to the questioner and an object corresponding to the requested item are overlapped each other. At step S506, the processing unit may record a set of the query, the answer and its statics (counts or ratio of fail and success) as a quality assurance (QA) history. Then, the process may end at step S507.

Figure 9:
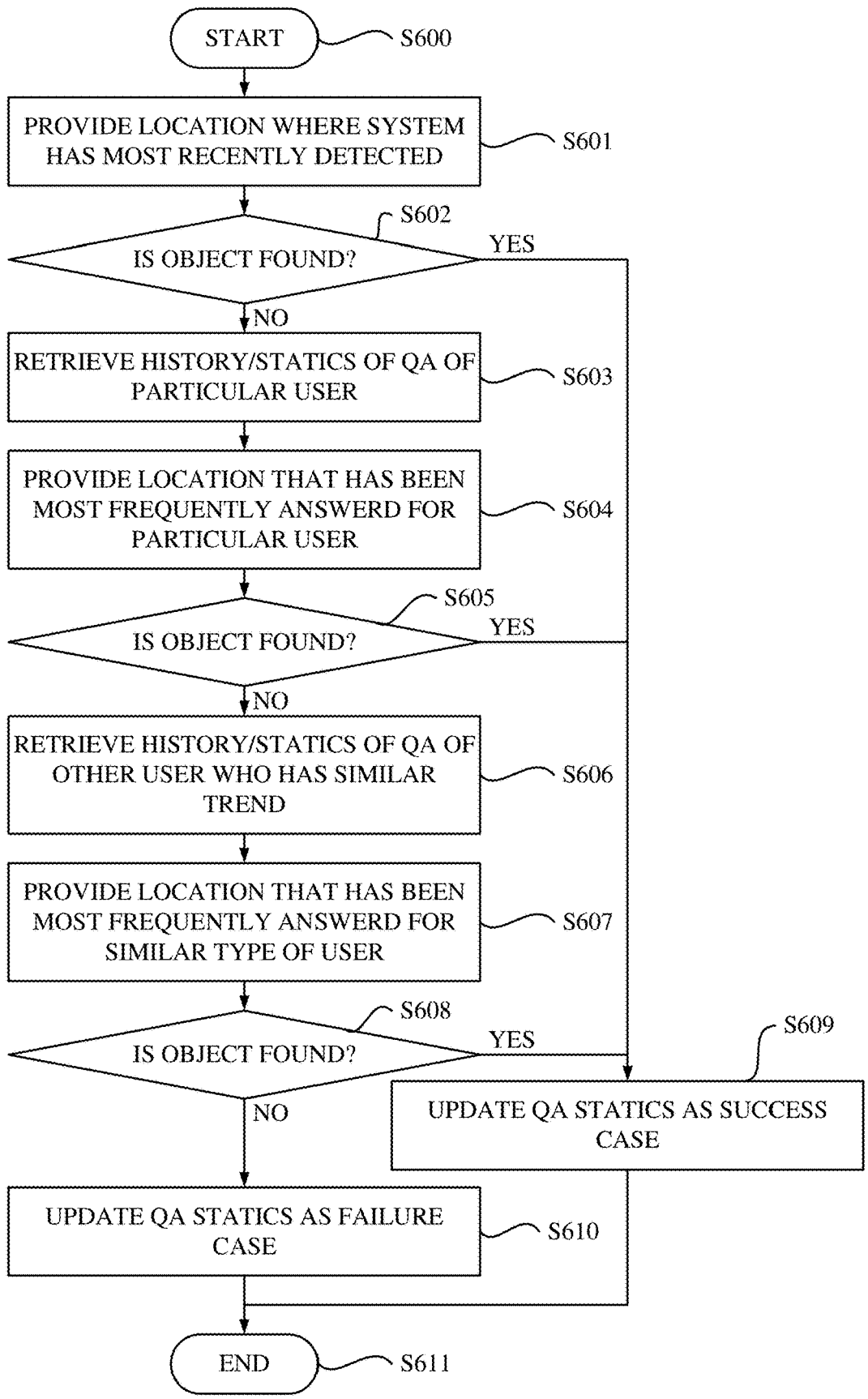
FIG. 9 shows a flow of providing one or alternative answers to a user through interactions according to an example embodiment of the disclosure.

As described above, the data collection server 160 can infer an alternative answer by leveraging the information obtained from one or more other edge devices 120 in the past. FIG. 9 shows a flow for providing one or more alternative answers to the questioner through interactions.

The flow shown in FIG. 9 may begin at step S600 in response to receiving a user query requested from certain end user (a questioner). In the following description, it is assumed that the aforementioned examined user query "where is [ID=yyyyyyyyyy]?" is transmitted from one edge device 120 to the data collection server 160.

At step S601, the data collection server 160 may provide a location where the system 100 has most recently detected the object having ID=yyyyyyyyyy as an answer. In step S601, the data collection server 160 may retrieve information matched with the search query from the collection of the analysis reports obtained from the edge device 120 of a particular service user to which the questioner belongs.

At step S602, a determination may be made as to whether the object is found or not. The questioner would ask same or similar query repeatedly to the system if the questioner does not find the requested object. Alternatively, the end user would return negative or positive acknowledgement to the system 100. The negative feedback (including repetition) may indicate the retrieved information is not correct.

If the system has received a positive feedback, the flow may transfer from step S602 to step S609. At step S609, the data collection server 160 may update quality assurance (QA) statics as success case, e.g., increment the count for success in association with a current set of the query and answer. If the system has received no positive feedback, the flow may transfer from step S602 to step S603.

At step S603, the data collection server 160 may retrieve the quality assurance (QA) history and statics of the particular service user. At step S604, the data collection server 160 may provide a location that has been most frequently answered for this particular service user. In step S604, the data collection server 160 may retrieve information matched with an alternative search query from the collection of the sets of the query, the answer and the statics. If end users have frequently asked locations of their smartphone, there are several possible locations associated with such frequently asked question. In this case, from among the possible locations, the location for which the system 100 has most frequently received positive feedbacks can be used for returning an answer.

At step S605, a determination may be further made as to whether the object is found or not. If the system has received a positive feedback in step S605, the flow may transfer to step S609. At step S609, the data collection server 160 may update QA statics as success case, e.g., increment the count for success in association with a current set of the query and answer. Then, the flow may end at step S611. If the system has received no positive feedback in step S605, the flow may transfer to step S606.

At step S606, the data collection server 160 may retrieve the QA history and statics of other service users who has similar trend to the particular service user to which the questioner belongs. For example, a group of service users who have a composition of a family similar to the particular service user may be selected. In step S606, the data collection server 160 may retrieve information matched with an alternative search query from the collection of information (a set of query, answer and its statics) obtained from the selected group. At step S607, the data collection server 160 may provide a location that has been most frequently answered for similar type of users.

The large amount of information at a level that does not lead to identifying any particular individual may allow the usage of other service user data, because the data collection may be performed in a similar manner (e.g., each cellphone may be stored as "xxxxxxxxx") and service users may behave similarly (e.g., commonly children leave toys on top of a piece of furniture and the toys often fall behind the furniture). The system 100 can recognize that the object having the identifier "xxxxxxxxxx" is smartphone, because each edge apparatus may utilize a similar convention for anonymizing data. Also the system can recognize a composition of family (e.g., one adult male, one adult female, two boys and one girl) and layout of rooms (e.g., four rooms, a living room and a dining room-kitchen). Thus, the data collection server 160 can make an alternative answer like, "Your smartphone can not be found at present, but it appears that many people like you sometimes put their smartphone under their pillows in their bedrooms", for example.

Since the object information database 166 includes both of a collection of analysis reports reported by the edge device 120 of current user and other user's edge device 120, and a collection of sets of a query, an answer and statics obtained for the one edge apparatus and/or other edge apparatus, the system 100 can search for information matched with the user query in a flexible manner.

At step S608, a determination may be further made as to whether the object is found or not. If the system has received a positive feedback in step S608, the flow may transfer to step S609. If the system has received no positive feedback in step S608, the flow may transfer to step S610. At step S610, the data collection server 160 may update QA statics as failure case, e.g., increment the count for failure in association with a current set of the query and answer. Then, the flow may end at step S611.

According to embodiments, various operations of the present disclosure may be provided by an apparatus, system, method and/or computer program products for managing object information detected by using the camera device 112, in which information defined to be protected can be confined within the private computer network 110 while leveraging remote resources of the data collection server 160 located outside the private computer network 110.

According to embodiments, users who receive services from the data collection server 160 can obtain answers from information set in accordance with their authority. The user can obtain an answer for a user query from the system 100 based on private information locally stored in the edge device 120 and non-private information accumulated in the data collection server 160. The answer obtained from the system 100 has a user comprehensible form since the private information stored locally in the edge device 120 is leveraged to complement an original answer from the data collection server 160. Since the users can control content of the analysis reports so as not to include the private information and the image data taken by the camera device 112 but to include general description and general event information about objects, sophisticated analysis can be achieved by leveraging remote resources located on the outside of the private computer network while avoiding privacy issues such as leakage of private information.

Further, the user can obtained an alternative answer by leveraging information originating from other users, without accessing to private information of other users. Furthermore, the statistical information of frequently asked queries tells us what kind of analysis information is not sufficient. Hence, it is made possible to recognize what kind of image analysis is requested at the edge device 120. By combining with the image analysis, the novel object information management technique enables us confirmation of locations of objects in a wide range in comparison with other technologies in which the special transceiver device are attached with the items of interest.

Computer Hardware Component

Figure 10:
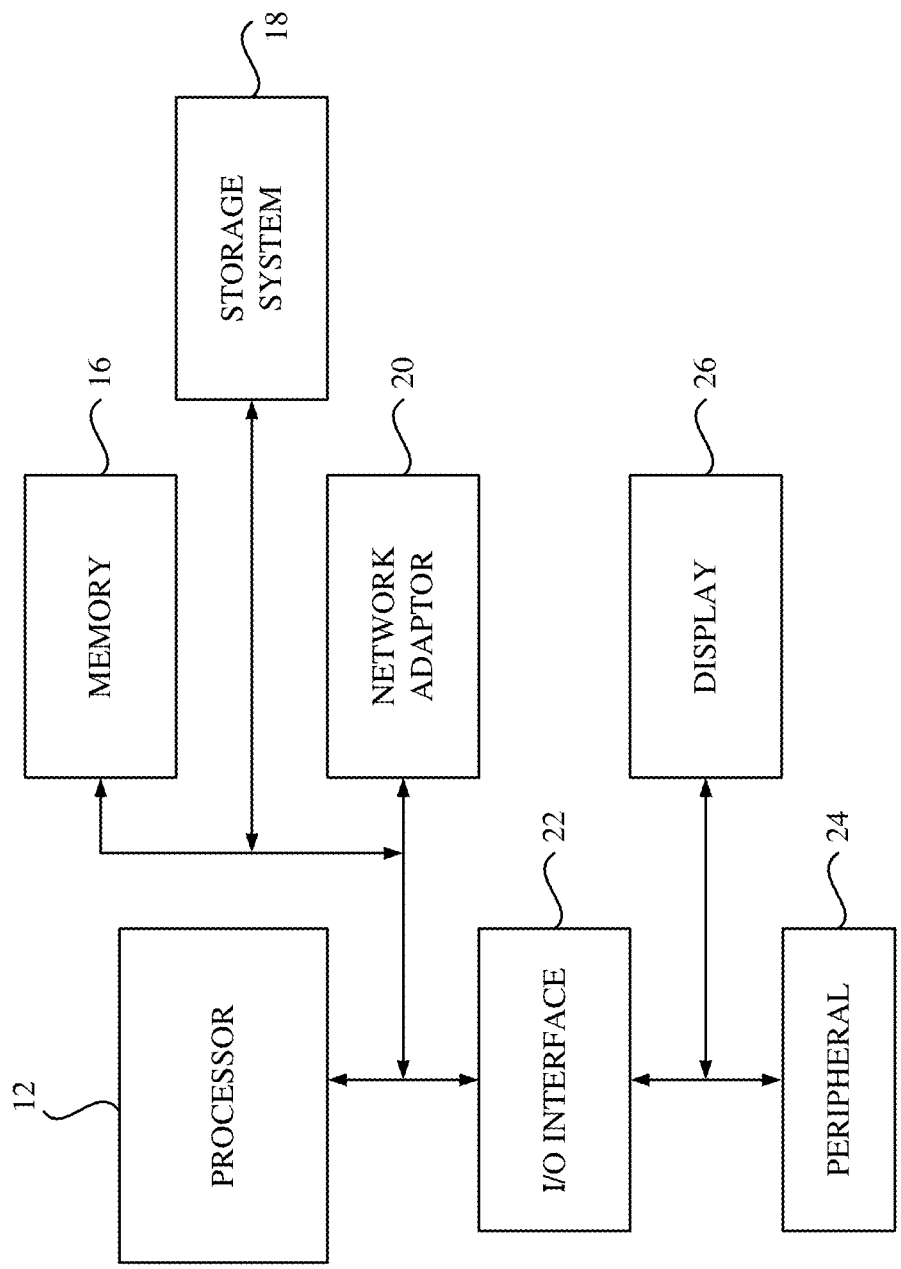
FIG. 10 depicts a schematic of a computer system, which can be used for the edge device and/or the data collection server, according to one or more embodiments of the disclosure.

Referring now to FIG. 10, a schematic of an example of a computer system 10, which can be used as the edge device 120 and/or the data collection server 160, is shown. The computer system 10 shown in FIG. 10 is implemented as a computer system. The computer system 10 is only one example of a suitable processing device and is not intended to suggest any limitation as to the scope of use or functionality of embodiments described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the disclosure.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the disclosure as described herein.

The computer system 10 may also communicate with one or more peripherals 24 such as a keyboard, a pointing device, a car navigation system, an audio system, the camera device 112, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Embodiments of the present disclosure may also include a system. The system may be configured with a memory storing program instructions; one or more interfaces configured to communicate with a sensor device and to access a private computer network; and a processor in communications with the memory and the one or more interfaces. The processor is configured, by executing the program instructions, to perform the following: record a mapping between private information to be protected and identifier information for an object; detect the object by analyzing sensor data received from a sensor device within the private computer network, wherein the object has one or more attributes associated therewith; generate an analysis report about the object by excluding the private information from the analysis report based on the mapping, wherein the analysis report includes a non-private part of the one or more attributes; and transmit the analysis report to a remote computer system located outside the private computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for computer-based object recognition for recognizing certain objects designed to leverage remote computer processing outside of a private setting while protecting privacy of the individuals, the method comprising:

receiving, by a first processing device, first sensor data every ten frames per second from a video camera connected to the first processing device by a universal serial bus connection, the first processing device located on a private network of an academic institution, wherein the video camera is permanently affixed to an interior of the academic institution;

receiving, by the first processing device, second sensor data every fifteen seconds from a thermal sensor connected to the first processing device by a wireless connection, wherein the thermal sensor is permanently affixed to the interior of the academic institution;

detecting, by the first processing device and based on a combination of the first sensor data of the video camera and the second sensor data of the thermal sensor, a first object in a hallway of the academic institution, wherein the first object has one or more attributes associated therewith, wherein a first attribute of the one or more attributes is that the first object is detected as a person;

comparing, by the first processing device, the first sensor data and the second sensor data to preexisting analysis stored in a data store of the first processing device;

determining, by the first processing device and based on the comparison, whether the first object is newly detected;

assigning, by the first processing device and in response to the first object is newly detected, a unique identifier to the first object, wherein the unique identifier is identifier information;

providing, by the first processing device and in response to the first object is newly detected, a generic name to the first object as identifier information by analyzing the first sensor data and the second sensor data;

receiving, by a microphone of the first processing device, a request for giving a specific name to the first object from a user, wherein the specific name is a second attribute;

determining, by the first processing device, the available memory of the first processing device;

deciding, by the first processing device, not to perform activity recognition based on the determined available memory of the first processing device;

offloading, by the first processing device and through a network input connection of the private network, the performance of activity recognition to a second processing device, wherein the second processing device is located within the private network;

receiving, by the first processing device and from the second processing device and through a network output connection, activity recognition analysis;

categorizing, by the first processing device and based on the received activity recognition analysis that the person is moving, wherein the received activity recognition analysis is third attribute;

recording, by the first processing device and before any transmission outside of the private network, a mapping into a first memory, the first memory communicatively coupled to the first processing device, wherein the mapping includes the first attribute and the second attribute as private information to be protected to the identifier information for the first object, wherein mapping permits protected private information from locally captured sensor while leveraging remote resources located outside the private computer network;

generating, by the first processing device and based on the mapping, an analysis report about the first object by excluding the private information from the analysis report, wherein the analysis report includes non-private information of the one or more attributes;

transmitting, by the first processing device, the generated analysis report to a remote computer system located outside the private computer network;

causing, by the first processing device, the remote computer system to perform ontology operations on the generated analysis report to identify one or more relationships between the first object and one or more other objects without receiving the private information;

receiving, by the first processing device, a user comprehensible query from a second user;

translating, by the first processing device and before transmitting to the remote computer system, the user comprehensible query into a privacy protected query, the privacy protected query lacking the private information;

performing, by the remote computer system and based on the identified one or more relationships and without the private information, a lookup based on the privacy protected query;

receiving, by the first processing device, an answer to the privacy protected query, the answer in a privacy protected form;

translating, by the first processing device, the answer into a user comprehensible answer; and providing, by the first processing device, a response to the second user that includes the user comprehensible answer.

* * * * *